United States Patent
Bienn et al.

(10) Patent No.: US 8,913,594 B2
(45) Date of Patent: Dec. 16, 2014

(54) ROUTING OF A CDMA MS INITIATED USSD REQUEST

(75) Inventors: Marvin Bienn, Dallas, TX (US); David Brombal, Plano, TX (US); Martin Nair, McKinney, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 355 days.

(21) Appl. No.: 13/205,914

(22) Filed: Aug. 9, 2011

(65) Prior Publication Data

US 2012/0243472 A1   Sep. 27, 2012

Related U.S. Application Data

(60) Provisional application No. 61/467,000, filed on Mar. 24, 2011.

(51) Int. Cl.
| | | |
|---|---|---|
| *H04W 4/00* | (2009.01) | |
| *H04W 4/14* | (2009.01) | |
| *H04L 29/06* | (2006.01) | |
| *H04W 88/14* | (2009.01) | |
| *H04W 80/08* | (2009.01) | |

(52) U.S. Cl.
CPC ............. *H04W 4/14* (2013.01); *H04L 69/08* (2013.01); *H04W 88/14* (2013.01); *H04W 80/085* (2013.01)
USPC .......... 370/335; 370/338; 370/343; 370/345; 370/356

(58) Field of Classification Search
None
See application file for complete search history.

(56) References Cited

U.S. PATENT DOCUMENTS

| | | | |
|---|---|---|---|
| 6,961,330 B1 * | 11/2005 | Cattan et al. | 370/352 |
| 8,139,522 B2 * | 3/2012 | Long et al. | 370/328 |
| 2002/0163938 A1 * | 11/2002 | Tuomainen et al. | 370/468 |
| 2003/0216147 A1 * | 11/2003 | Morin et al. | 455/466 |
| 2008/0117893 A1 * | 5/2008 | Witzel et al. | 370/352 |

OTHER PUBLICATIONS

Bienn, Marvin. Mobile Initiated USSD Procedures. Retrieved from the Internet: ftp://ftp,3gpp2.org/TSGX/Working/2011/2001-03-Seoul/WG3-MMD/X30-2011-03-28-021%20%5BE%5D%20Mobile%20Initiated%20USSD%20procedure.doc./ Mar. 27, 2011.
3GPP2 X.S0004-540-E v2.0, Mobile Application Part (MAP)—Operations Signaling Protocols, Jul. 2007.
3GPP2 X.S0004-550-E v4.0, Mobile Application Part (MAP)—Parameters Signaling Protocols, Jan. 2010.
3GPP2 A.S0014-C v3.0, Interoperability Specification (IOS) for cdma2000 Access Network Interfaces—Part 4 (A1, A2, A1p, and A5 Interfaces), Sep. 2010.
3GPP2 A. S0013-C v3.0, Interoperability Specification (IOS) for cdma2000 Access Network Interfaces—Part 3 Features, Sep. 2010.

* cited by examiner

*Primary Examiner* — Kwang B Yao
*Assistant Examiner* — Hardikkumar Patel

(57) ABSTRACT

A Mobile Switching Center (MSC) of a CDMA telecommunications wireless network which includes a CDMA mobile station (MS), a CDMA base station (BS), a CDMA HLR, and an Unstructured Supplementary Service Data (USSD) Gateway. The MSC is capable of receiving a MS initiated USSD request from the BS, determining if the subscriber is authorized to use USSD services and if authorized constructing a MAP message containing the USSD Request which is then sent to a USSD Gateway identified by subscriber profile information received during registration. The MSC is also capable of identifying MAP messaging it receives that contains USSD messaging, constructing an IOS message that contains the USSD messaging and sending the IOS message to the BS which in turn sends it to the MS.

24 Claims, 3 Drawing Sheets

ROUTING OF A CDMA MS INITIATED USSD REQUEST

CROSS-REFERENCE TO RELATED APPLICATIONS

This application claims the benefit of U.S. Provisional Application No. 61/467,000, filed Mar. 24, 2011, the disclosure of which is incorporated herein by reference.

TECHNICAL FIELD

The present invention is related to the routing of a CDMA MS USSD initiated request. (As used herein, references to the "present invention" or "invention" relate to exemplary embodiments and not necessarily to every embodiment encompassed by the appended claims.) More specifically, the present invention is related to the routing of a CDMA MS USSD initiated request where a Mobile Switching Center receives and processes a USSD message in a first form, such as an IOS ADDS deliver message, and routes the USSD message in a second form, such as a MAP SMDPP INVOKE message, to a USSD Gateway.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

USSD was originally developed for GSM. The unstructured supplementary service data (USSD) mechanism allows the Mobile Station (MS) user and a PLMN operator defined application to communicate in a way which is transparent to the MS and to intermediate network entities. The USSD mechanism allows for the development of operator and $3^{rd}$ party specific supplementary services.

There are two modes of USSD: MMI-mode and application mode. MMI-mode USSD is for the transparent transport of MMI (Man Machine Interface) strings entered by the user to the network and for the transparent transport of text strings from the network that are displayed by the mobile for user information.

Application mode USSD is for the transparent transport of data between the network and the UE (User Equipment). Application mode USSD is intended to be used by applications in the network and their peer applications in the UE.

USSD communications over the radio interface uses short dialogues with peak data throughput rate capabilities of up to approximately 600 bits/s outside of a call and 1000 bits/s during a call.

USSD may be initiated by the MS user, or by the network (i.e., an application server). Unlike Short Message Service (SMS) messages, USSD messages create a real-time connection during a USSD session. The connection remains open, allowing a two-way exchange of a sequence of data. Several examples of how USSD Services are used include: Pre-paid balance Inquiry, Balance Transfer (payment from one's balance to another balance), Voting ("Please rate our customer service: 1=Good, 2=OK, 3=Bad" after a call to a CSR), and Call Me (requesting another party to call you). A USSD Gateway is used to proxy the USSD messaging between the MS user or the UE and the application server providing the service (e.g., a mobile banking application server providing a checking account balance to the MS user).

CDMA USSD service is presently being developed by 3GPP2 ($3^{rd}$ generation Partnership Project 2). There is no existing solution for how to route a CDMA MS USSD initiated request to a USSD Gateway.

BRIEF SUMMARY OF THE INVENTION

The present invention pertains to a Mobile Switching Center (MSC) of a Code Division Multiple Access (CDMA) telecommunications wireless network including a CDMA mobile station (MS), a CDMA base station (BS), a CDMA Home Location Register (HLR) and an Unstructured Supplementary Service Data (USSD) Gateway. The Mobile Switching Center comprises a network interface unit which receives a USSD message in a first form. The Mobile Switching Center comprises a processing unit which processes the USSD message in the first form, constructs a USSD message in a second form and routes the USSD message in a second form to the CDMA telecommunication wireless network. The USSD message in a first form is different from the USSD message in a second form.

The present invention pertains to a Mobile Switching Center of a CDMA telecommunications wireless network including a CDMA mobile station (MS), a CDMA base station (BS), a CDMA Home Location Register (HLR) and an Unstructured Supplementary Service Data (USSD) Gateway. The Mobile Switching Center comprises a processing unit which constructs a Mobile Application Parts (MAP) SMSDeliveryPointToPoint (SMDPP) INVOKE message having one or more parameters that identifies the SMDPP INVOKE is carrying USSD information. The Mobile Switching Center comprises a network interface unit through which the processing unit routes the SMDPP INVOKE message to the CDMA telecommunication wireless network.

The present invention pertains to a method of a Mobile Switching Center of a CDMA telecommunications wireless network including a CDMA mobile station (MS), a CDMA base station (BS), a CDMA Home Location Register (HLR) and an Unstructured Supplementary Service Data (USSD) Gateway. The method comprises the steps of receiving a USSD message in a first form at a network interface unit. There is the step of processing the USSD message in the first form with a processing unit. There is a step of constructing a USSD message in the second form. There is the step of routing the USSD message in a second form with the processing unit through the network interface unit to the CDMA telecommunication wireless network.

The present invention describes how a MSC/MSCe routes a USSD message received from a CDMA MS to a USSD Gateway.

The present invention pertains to a Mobile Switching Center (MSC) of a Code Division Multiple Access (CDMA) telecommunications wireless network including a CDMA mobile station (MS), a CDMA base station (BS), a CDMA Home Location Register (HLR) and an Unstructured Supplementary Service Data (USSD) Gateway. The Mobile Switching Center comprises a network interface unit which receives a USSD message in a second form. The Mobile Switching Center comprises a processing unit which processes the USSD message in the second form, constructs a USSD message in a first form and routes the USSD message in a first form to the CDMA telecommunication wireless network. The USSD message in a second form is different from the USSD message in a first form.

The invention:
1. Enhances the subscriber profile in the HLR by adding new CDMA USSD information.
2. The MSC/MSCe has been enhanced to receive/understand the new USSD information in the subscriber profile, when sent by the HLR.
3. MAP operations have been enhanced to send USSD information between a MSC/MSCe and a USSD Gateway,
4. The MSC/MSCe operations have been enhanced to determine if a subscriber is authorized to use USSD services (e.g., sending a mobile initiated USSD request to a USSD gateway supporting one or more application servers) based upon new USSD information in the subscriber profile.
5. The MSC/MSCe operations have been enhanced to route the mobile initiated USSD request to the USSD Gateway based upon the new CDMA USSD subscriber information.

Note for this invention MSCe functionality includes MSC functionality and thus the two network elements are interchangeable.

BRIEF DESCRIPTION OF THE DRAWING

In the accompanying drawings, the preferred embodiment of the invention and preferred methods of practicing the invention are illustrated in which.

DETAILED DESCRIPTION

Figure 1:
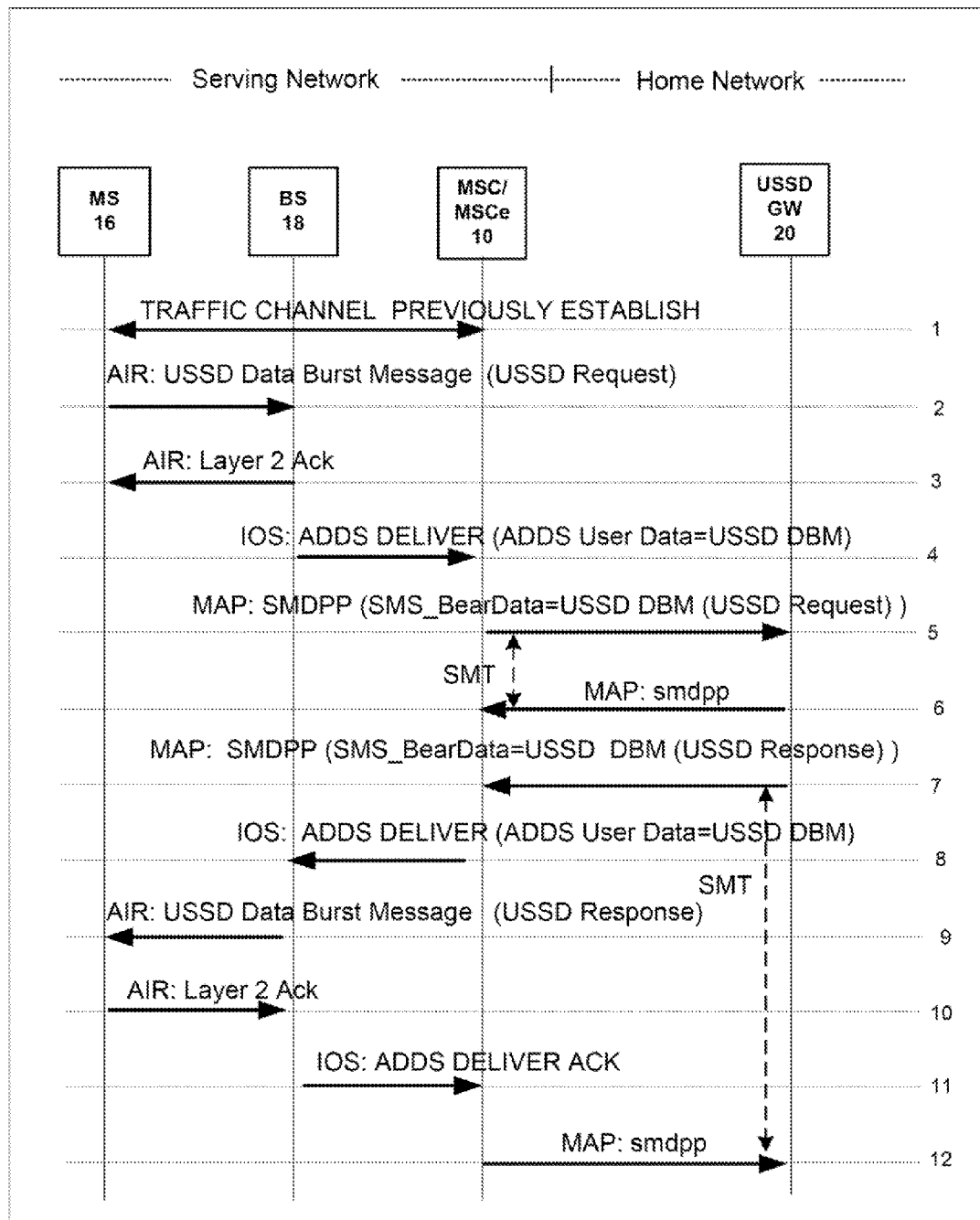
FIG. 1 shows a mobile initiated USSD request information flow in regard to the present invention.
Figure 2:
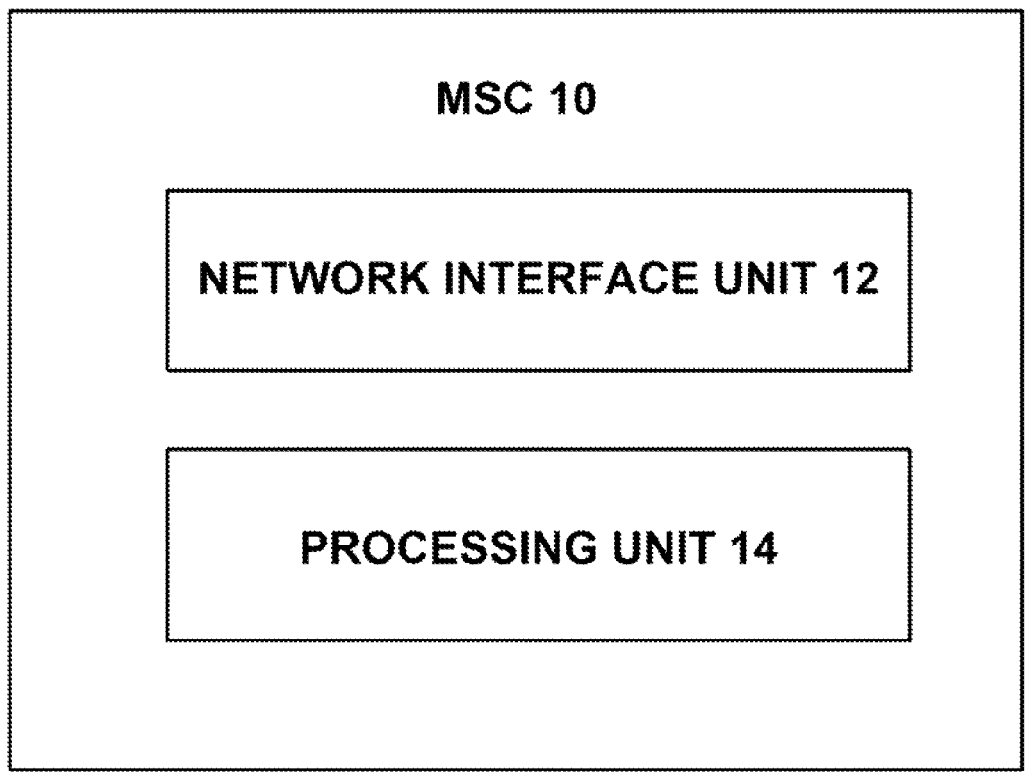
FIG. 2 is a block diagram of the MSC of the present invention.
Figure 3:
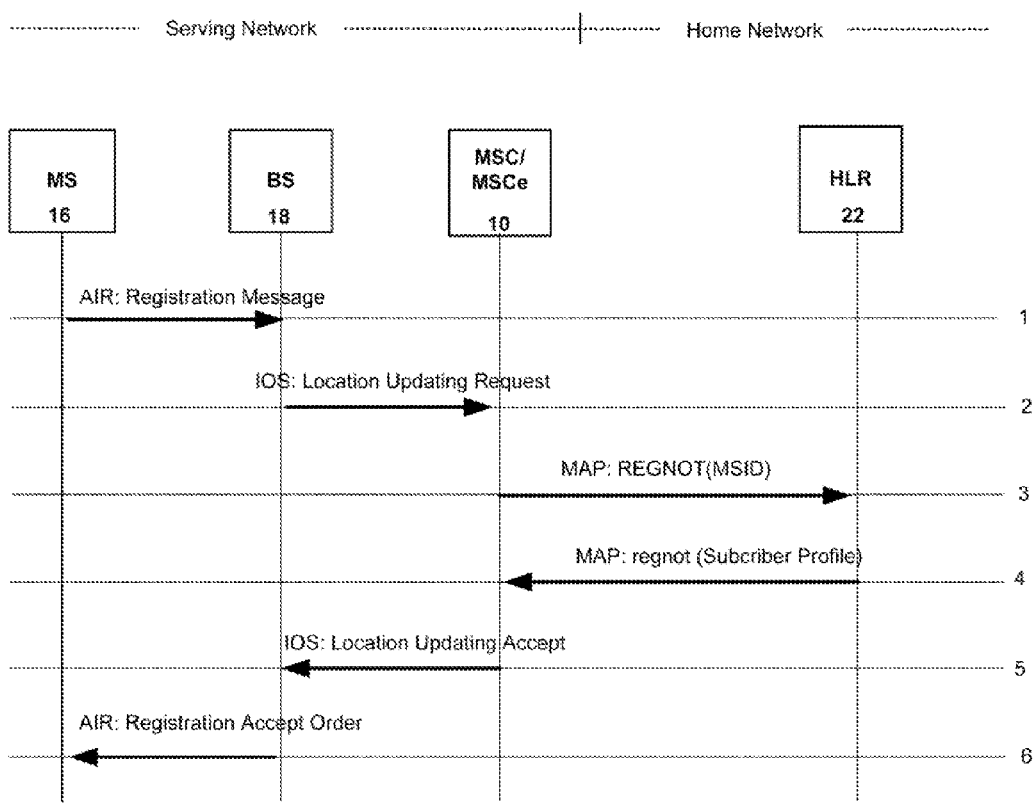
FIG. 3 shows a mobile initiated registration information flow.

Referring now to the drawings wherein like reference numerals refer to similar or identical parts throughout the several views, and more specifically to FIGS. 1 and 3 thereof, where there is shown a Mobile Switching Center 10 of a CDMA telecommunications wireless network including a CDMA mobile station (MS) 16, a CDMA base station (BS) 18, a CDMA Home Location Register (HLR) 22 and an Unstructured Supplementary Service Data (USSD) Gateway 20. As shown in FIG. 2, the Mobile Switching Center 10 comprises a network interface unit 12 which receives a USSD message in a first form and a processing unit 14 which processes the USSD message in the first form and routes the USSD message in a second form to the CDMA telecommunication wireless network. The first form is different from the second form.

The processing unit 14 may process information in the USSD message in the first form, construct the USSD message in the second form and route the USSD message in the second form to the USSD Gateway 20. The processing unit 14 may examine a subscriber profile and the processing unit 14 may determine if the USSD message in the first form is allowed to be processed and the USSD message in the second form routed to the USSD Gateway 20. The subscriber profile may contain at least one parameter which defines an address of the USSD Gateway 20. The address of the USSD Gateway 20 may be used by the processing unit 14 to construct the USSD message in the second form and to send the USSD message in the second form through the network interface unit 12 to the USSD Gateway 20. The USSD message of the second form may be a MAP SMDPP INVOKE message.

The network interface unit 12 may receive the USSD message of the first form from the CDMA BS. The USSD message of the first form may be an Interoperability Specification (IOS) ADDS deliver message having an ADDS User Part informational element having an Application Data Message field that contains a USSD message and having a Data Burst Type set to a value of USSD. There may be a MAP SMDPP INVOKE message which has an SMS_BearData parameter which is constructed from the ADDS User Part informational element in the IOS ADDS deliver message received by the network interface unit 12 from the CDMA BS 18.

The processing unit 14 may process information in the USSD message in the second form to construct a USSD message in the first form and route the USSD message in the first form through the network interface unit 12 to the CDMA BS 18. The processing unit 14 may examine a subscriber profile and the processing unit 14 may determine if the USSD message in the second form is allowed to be processed and the USSD message of the first form routed to the CDMA BS 18. The network interface unit 12 may receive the USSD message of the second form from the USSD Gateway 20.

The present invention pertains to a method of a Mobile Switching Center 10 of a CDMA telecommunications wireless network including a CDMA mobile station (MS) 16, a CDMA base station (BS) 18, a CDMA Home Location Register (HLR) 22 and an Unstructured Supplementary Service Data (USSD) Gateway 20. The method comprises the steps of receiving a USSD message in a first form at a network interface unit 12. There is the step of processing the USSD message in the first form with a processing unit 14. There is the step of routing the USSD message in a second form with the processing unit 14 through the network interface unit 12 to the CDMA telecommunication wireless network.

There may be the steps of the processing unit 14 processing information in the USSD message in the first form, and constructing the USSD message in the second form and routing the USSD message in the second form to the USSD Gateway 20. There may be the steps of the processing unit 14 examining a subscriber profile and determining if the USSD message in the first form is allowed to be processed and the USSD message in the second form routed to the USSD Gateway 20. The subscriber profile may contain at least one parameter which defines an address of the USSD Gateway 20. There may be the steps of the processing unit 14 using the address of the USSD Gateway 20 to construct the USSD message in the second form, and sending the USSD message in the second form through the network interface unit 12 to the USSD Gateway 20. The USSD message of the second form may be MAP SMDPP INVOKE message.

There may be the step of the network interface unit 12 receiving the USSD message of the first form from the CDMA BS 18. The USSD message of the first form may be an IOS ADDS DELIVER message having an ADDS User Part informational element having an Application Data Message field that contains a USSD message and having a Data Burst Type field set to a value of USSD. There may be an MAP SMDPP INVOKE message that has an SMS_BearData parameter which is constructed from the ADDS User Part informational element in the IOS ADDS DELIVER message received by the network interface unit 12 from the CDMA BS 18.

There may be the steps of the processing unit 14 processing information in the USSD message in the second form to construct a USSD message in the first form, and routing the USSD message in the first form through the network interface unit 12 to the CDMA BS 18. There may be the steps of the processing unit 14 examining a subscriber profile and determining if the USSD message in the second form is allowed to be processed for routing to the CDMA BS 18. There may be the step of the network interface unit 12 receiving the USSD message of the second form from the USSD Gateway 20.

The present invention pertains to a Mobile Switching Center 10 of a CDMA telecommunications wireless network including a CDMA mobile station (MS) 16, a CDMA base station (BS) 18, a CDMA Home Location Register (HLR) 22 and an Unstructured Supplementary Service Data (USSD) Gateway 20. The Mobile Switching Center 10 comprises a processing unit 14 which constructs a MAP SMDPP INVOKE message having a parameter that identifies the SMDPP INVOKE is carrying USSD information. The Mobile Switching Center 10 comprises a network interface unit 12 through which the processing unit 14 routes the SMDPP INVOKE message to the CDMA telecommunication wireless network.

The MAP SMDPP INVOKE parameter that identifies the SMDPP INVOKE is carrying USSD information may be a ServiceIndicator parameter value.

In the operation of the invention, an information flow describing a mobile initiated Registration is shown in FIG. 3.

1. The MS 16 initiates a registration operation by sending the Registration Message to the BS 18.
2. On reception of the Registration Message the BS 18 constructs an IOS Location Updating Request message, places it in the Complete Layer 3 Information message, and sends it to the MSC/MSCe 10.
3. On reception of the Complete Layer 3 Information message the MSC/MSCe 10 constructs a MAP RegistrationNotification (REGNOT) INVOKE message to report the location of MS 16 and to and obtain its subscriber profile information. The MSC/MSCe 10 sends the REGNOT message to HLR 22.
4. The HLR 22 determines that authorization can be granted to the MS 16. It returns the subscriber profile, containing a USSDAddress parameter (if the subscriber has subscribed to receive USSD services), in a MAP RegistrationNotification Return Result (regnot) message to MSC/MSCe 10.
5. The MSC/MSCe 10 sends an IOS Location Updating Accept message to BS 18 to indicate that the Location Updating Request message has been processed.

The BS 18 may transmit a Registration Accepted Order to MS 16 to indicate a successful location registration operation.

In the operation of the invention, an information flow describing a mobile initiated USSD request is shown in FIG. 1. Note the interactions between the USSD Gateway and the application server performing the service are not shown.

1. An MS 16 that is currently on a traffic channel determines that a USSD message is to be sent to the network. Note that the precondition for the flow has been established. That is, a MS 16 has successfully registered with MSC/MSCe 10 (e.g., as described for FIG. 3) and the subscriber profile has been downloaded to MSC/MSCe 10. Also note if a traffic channel has not been previously established, the MS 16 establishes a traffic channel as defined in [4].
2. The BS 18 receives a Data Burst Message (DBM) from an MS 16 on the traffic channel with a burst type indicating USSD.
3. If a Layer 2 Ack was requested by the MS 16, the BS 18 sends a Layer 2 Ack to the MS 16 on the traffic channel.
4. The BS 18 sends an ADDS Deliver message to the MSC/MSCe 10. The Application Data Message field of the ADDS User Data Informational Element contains the USSD DBM received from the MS 16. The Data Burst Type field of the ADDS liver Data Informational Element is set to USSD.
5. The MSC/MSCe 10 determines if the MS 16 is allowed to use USSD Services by examining the subscriber profile. If the subscriber profile, associated with the subscriber sending the USSD message, contains a USSDAddress parameter the MSC/MSCe 10 constructs a MAP SMDPP INVOKE message. The SMS_BearData parameter of the SMDPP INVOKE message is constructed from the ADDS liver Part in the ADDS Deliver message. The SMS TeleserviceIdentifier of the SMDPP INVOKE message is set to USSD. The ServiceIndicator parameter of the SMDPP INVOKE message is set to USSD. The SMDPP INVOKE is sent to the USSD_Address identified in the USSDAddress parameter (e.g., the USSD Gateway 20 address) in the Subscriber Profile. The MSC/MSCe 10 starts timer SMT (Short Message Delivery Timer). If the subscriber profile does not contain a USSDAddress parameter, the subscriber is not authorized to use USSD services and the MSC/MSCe 10 rejects the USSD session setup (i.e., the SMDPP INVOKE message is not constructed or sent to the USSD Gateway 20).
6. The USSD Gateway 20 caches the MSC/MSCe 10 address until the USSD transaction is complete. The USSD Gateway 20 acknowledges the MAP SMDPP INVOKE message (step 5) by sending an SMDPP return result to the MSC/MSCe 10. Upon receiving the MAP SMDPP return result message the MSC/MSCe 10 stops timer SMT.
7. The USSD Gateway 20 constructs a MAP SMDPP INVOKE message. The SMS_BearData parameter contains a USSD Response. The SMS_TeleserviceIdentifier is set to USSD and/or the ServiceIndicator parameter is set to USSD. The SMDPP INVOKE is send to the MSC/MSCe 10. The USSD Gateway 20 starts timer SMT.
8. The MSC/MSCe 10 identifies the received MAP SMDPP INVOKE message as containing USSD messaging (e.g., by examining the SMS_TeleserviceIdentifier and/or the ServiceIndicator parameter). The MSC/MSCe 10 constructs an IOS ADDS Deliver message. The Data Burst Type field of the ADDS User Data Informational Element is set to USSD. The SMS_BearData parameter of the MAP SMDPP INVOKE is used to create the Application Data Message field of the ADDS User Data Informational Element. The MSC/MSCe 10 sends the IOS ADDS Deliver message to the BS 18.
9. The BS 18 transmits the USSD message over the forward traffic channel. If the BS 18 does not receive an acknowledgment after transmitting the USSD Data Burst message, it shall retransmit the message. The BS shall not exceed a maximum number of retransmissions, to be selected by the BS manufacturer or the operator. When the BS reaches the maximum number of retransmissions, it shall declare a Layer 2 Ack failure and initiate call clearing.
10. The MS 16 acknowledges delivery of the short message on the traffic channel with a Layer 2 Ack.
11. If the MSC/MSCe 10 has requested a response by including the tag element in the ADDS Deliver message (Step 8), the BS 18 replies with an ADDS Deliver Ack message when it has received acknowledgment from the MS 16 that the message was delivered. If a Tag element was included in the ADDS Deliver message, the BS 18 shall include the Tag element in the ADDS Deliver Ack message, and set it to the same value as that received in the ADDS Deliver message.

12. The MSC/MSCe 10 acknowledges the MAP SMDPP INVOKE message (Step 7) by sending an MAP SMDPP return result to the USSD GW. Upon receiving the MAP SMDPP return result message the USSD GW stops timer SMT. Note if the traffic channel was setup for the USSD transaction, the MS releases the traffic channel by sending a Release message to BS 18

Elements of the invention include:
1. The MAP Profile [2] has been enhanced with a new optional parameter called "USSDAddress". If the subscriber has subscribed to USSD services, the MAP profile for the subscriber will be enhanced to include the "USSDAddress" parameter.
2. The MAP SMDPP INVOKE [1] had been enhanced to identify that the SMDPP INVOKE contains USSD messaging (e.g., a new SMS_TeleserviceIdentifier value [2] for USSD service is defined and a new ServiceIndicator parameter value [2] for USSD is defined).
3. The MSC/MSCe operation is enhanced.
   a. To allow or disallow the MS 16 from initiating (e.g., a MS 16 initiated USSD Request) or receiving (e.g., a Network initiated USSD Request or a Network Initiated USSD Notification) USSD services based upon receiving a USSDAddress parameter in the Subscriber profile obtained from the HLR 22 during the MS 16 Registration procedure. (e.g., see the description of Step 4 of FIG. 3).
   b. To construct a MAP SMDPP INVOKE using the ADDS User Data Informational Element received in a IOS message (e.g., IOS ADDS Page message [3], IOS ADDS Deliver message [3], IOS ADDS Transfer message [3]) (e.g., see the description of Step 5 of FIG. 1).
   c. To construct a IOS ADDS Page or LOS ADDS Deliver from an MAP SMDPP INVOKE that had been enhanced to identify that the MAP SMDPP INVOKE contains USSD messaging (e.g., see the description of Step 8 of FIG. 1).

There are believed to be no CDMA USSD mechanisms for:
1. How an MSC/MSCe 10 determines the USSD Gateway 20 address for a CDMA mobile initiated USSD request.
2. How an MSC/MSCe 10 determines if a MS 16 is allowed or disallowed from initiating (e.g., a MS 16 initiated USSD Request) or receiving (e.g., a Network initiated USSD Request or a Network Initiated USSD Notification) USSD services.
3. Defining how an MSC/MSCe 10 constructs a MAP SMDPP INVOKE for carrying USSD information.

The present invention solves all of these points.

Abbreviations
AIR: CDMA Over the Air Interface
BS: Base Station
GW: Gateway
HLR: Home Location Register
IOS: Interoperability Specification
MAP: Mobile Application Part
MMI: Man-Machine Interface
MS: Mobile Station
MSC Mobile Switching center
MSCe: Mobile Switching Center emulation
SMDPP: SMSDeliveryPointToPoint
UE User Equipment
USSD: Unstructured Supplementary Service Data References, all of which are incorporated by reference.
[1] 3GPP2 X.S0004-540-E v2.0, Mobile Application Part (MAP)—Operations Signaling Protocols, July 2007.
[2] 3GPP2 X.S0004-550-E v4.0, Mobile Application Part (MAP)—Parameters Signaling Protocols, January 2010.
[3] 3GPP2 A.S0014-C v3.0, Interoperability Specification (IOS) for cdma2000 Access Network Interfaces—Part 4 (A1, A2, A1p, and A5 Interfaces), September 2010.
[4] 3GPP2 A.S0013-C v3.0, Interoperability Specification (IOS) for cdma2000 Access Network Interfaces—Part 3 Features, September 2010.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A Mobile Switching Center (MSC) of a Code Division Multiple Access (CDMA) telecommunications wireless network including a CDMA mobile station (MS), a CDMA base station (BS), a CDMA Home Location Register (HLR) and an Unstructured Supplementary Service Data (USSD) Gateway, the MSC comprising:
a network interface unit configured to receive a USSD message in a first form; and
a processing unit configured to:
process the USSD message in the first form,
examine a subscriber profile,
determine, based on the subscriber profile, whether the USSD message in the first form is allowed to be processed for routing to the USSD Gateway and
route the USSD message in a second form to the CDMA telecommunication wireless network when the USSD message is allowed to be processed for routing to the USSD Gateway,
the USSD message of the first form being an Interoperability Specification (IOS) ADDS Deliver message having an ADDS User Part informational element having an Application Data Message field containing a USSD message and having a Data Burst Type field set to a value of USSD.

2. The MSC of claim 1 wherein the processing unit is further configured to process information in the USSD message in the first form, construct the USSD message in the second form and route the USSD message in the second form to the USSD Gateway.

3. The MSC of claim 2 wherein the subscriber profile contains at least one parameter that defines an address of the USSD Gateway.

4. The MSC of claim 3 wherein the processing unit is further configured to use the address of the USSD Gateway to construct the USSD message in the second form and to send the USSD message in the second form through the network interface unit to the USSD Gateway.

5. The MSC of claim 4 wherein the USSD message of the second form is a Mobile Application Part (MAP) Short Message Service (SMS) DeliveryPointToPoint (SMDPP) INVOKE message.

6. The MSC of claim 1 wherein the network interface unit is further configured to receive the USSD message of the first form from the CDMA BS.

7. A Mobile Switching Center (MSC) of a Code Division Multiple Access (CDMA) telecommunications wireless network including a CDMA mobile station (MS), a CDMA base station (BS), a CDMA Home Location Register (HLR) and an Unstructured Supplementary Service Data (USSD) Gateway, the MSC comprising:
   a network interface unit configured to receive a USSD message in a first form from the CDMA BS; and
   a processing unit configured to:
      process the USSD message in the first form,
      examine a subscriber profile,
      determine, based on the subscriber profile, whether the USSD message in the first form is allowed to be processed for routing to the USSD Gateway, and
      route the USSD message in a second form to the CDMA telecommunication wireless network when the USSD message is allowed to be processed for routing to the USSD Gateway,
   the USSD message of the first form being an Interoperability Specification (IOS) ADDS Deliver message having an ADDS User Part informational element having an Application Data Message field containing a USSD message and having a Data Burst Type field set to a value of USSD.

8. The MSC of claim 7 wherein a Mobile Application Part (MAP) Short Message Service (SMS) DeliveryPointToPoint (SMDPP) INVOKE message has an SMS_BearData parameter which is constructed from the ADDS User Part informational element in the IOS ADDS Deliver message received by the network interface unit from the CDMA BS.

9. The MSC of claim 1 wherein the processing unit is further configured to process information in the USSD message in the second form to construct a USSD message in the first form and route the USSD message in the first form through the network interface unit to the CDMA BS.

10. The MSC of claim 9 wherein the processing unit is further configured to examine the subscriber profile and determine whether the USSD message in the second form is allowed to be processed for routing to the CDMA BS.

11. The MSC of claim 1 wherein the network interface unit is further configured to receive the USSD message of the second form from the USSD Gateway.

12. A method of a Mobile Switching Center (MSC) of a Code Division Multiple Access (CDMA) telecommunications wireless network including a CDMA mobile station (MS), a CDMA base station (BS), a CDMA Home Location Register (HLR) and an Unstructured Supplementary Service Data (USSD) Gateway comprising:
   receiving a USSD message in a first form at a network interface unit;
   processing the USSD message in the first form with a processing unit;
   examining a subscriber profile;
   determining, based on the subscriber profile, whether the USSD message in the first form is allowed to be processed for routing to the USSD Gateway; and
   routing the USSD message in a second form with the processing unit through the network interface unit to the CDMA telecommunication wireless network when the USSD message is allowed to be processed for routing to the USSD Gateway,
   the USSD message of the first form being an Interoperability Specification (IOS) ADDS Deliver message having an ADDS User Part informational element having an Application Data Message field containing a USSD message and having a Data Burst Type field set to a value of USSD.

13. The method of claim 12 further comprising:
   the processing unit processing information in the USSD message in the first form;
   constructing the USSD message in the second form; and
   routing the USSD message in the second form to the USSD Gateway.

14. The method of claim 13 wherein the subscriber profile contains at least one parameter that defines an address of the USSD Gateway.

15. The method of claim 14 further comprising:
   the processing unit using the address of the USSD Gateway to construct the USSD message in the second form; and
   sending the USSD message in the second form through the network interface unit to the USSD Gateway.

16. The method of claim 15 wherein the USSD message of the second form is a Mobile Application Part (MAP) SMS-DeliveryPointToPoint (SMDPP) INVOKE message.

17. The method of claim 12 further comprising:
   the network interface unit receiving the USSD message of the first form from the CDMA BS.

18. A method of a Mobile Switching Center (MSC) of a Code Division Multiple Access (CDMA) telecommunications wireless network including a CDMA mobile station (MS), a CDMA base station (BS), a CDMA Home Location Register (HLR) and an Unstructured Supplementary Service Data (USSD) Gateway comprising:
   receiving a USSD message in a first form at a network interface unit from the CDMA BS;
   processing the USSD message in the first form with a processing unit; and
   routing the USSD message in a second form with the processing unit through the network interface unit to the CDMA telecommunication wireless network,
   the USSD message of the first form being an Interoperability Specification (IOS) ADDS deliver message having an ADDS User Part informational element having an Application Data Message field containing a USSD message and having a Data Burst Type set to a value of USSD.

19. The method of claim 18 wherein a Mobile Application Part (MAP) SMSDeliveryPointToPoint (SMDPP) INVOKE message has an SMS_BearData parameter which is constructed from the ADDS User Part informational element in the IOS ADDS deliver message received by the network interface unit from the CDMA BS.

20. The method of claim 12 further comprising:
   the processing unit processing information in the USSD message in the second form to construct a USSD message in the first form, and routing the USSD message in the first form through the network interface unit to the CDMA BS.

21. The method of claim 20 further comprising:
   the processing unit examining a subscriber profile and determining if the USSD message in the second form is allowed to be processed for routing to the CDMA BS.

22. The method of claim 12 further comprising:
   the network interface unit receiving the USSD message of the second for from the USSD Gateway.

23. A Mobile Switching Center (MSC) of a Code Division Multiple Access (CDMA) telecommunications wireless network including a CDMA mobile station (MS), a CDMA base station (BS), a CDMA Home Location Register (HLR) and an Unstructured Supplementary Service Data (USSD) Gateway comprising:
   a processing unit configured to examine a subscriber profile and determine, based on the subscriber profile, whether USSD information is allowed to be processed for routing to the USSD Gateway, and to construct a Mobile Application Part (MAP) Short Message Service (SMS) DeliveryPointToPoint (SMDPP) INVOKE message having a parameter that identifies the SDMPP INVOKE is carrying USSD information; and a network interface unit through which the processing unit is configured to route the SMDPP INVOKE message to the CDMA telecommunication wireless network when the USSD information is allowed to be processed for routing to the USSD Gateway, the USSD information being part of an Interoperability Specification (IOS) ADDS Deliver message having an ADDS User Part informational element having an Application Data Message field containing a USSD message and having a Data Burst Type field set to a value of USSD.

24. The Mobile Switching Center of claim 23 wherein the parameter is a ServiceIndicator parameter value.

* * * * *

UNITED STATES PATENT AND TRADEMARK OFFICE
CERTIFICATE OF CORRECTION

PATENT NO. : 8,913,594 B2  
APPLICATION NO. : 13/205914  
DATED : December 16, 2014  
INVENTOR(S) : Bienn et al.

Page 1 of 1

It is certified that error appears in the above-identified patent and that said Letters Patent is hereby corrected as shown below:

Specification

In Column 2, Line 31, delete "Parts (MAP)" and insert -- Part (MAP) --, therefor.

In Column 6, Line 2, delete "liver" and insert -- User --, therefor.

In Column 6, Line 11, delete "liver" and insert -- User --, therefor.

In Column 7, Line 37, delete "LOS" and insert -- IOS --, therefor.

Claims

In Column 10, Line 55, in Claim 22, delete "for" and insert -- form --, therefor.

Signed and Sealed this  
Sixteenth Day of August, 2016

Michelle K. Lee  
*Director of the United States Patent and Trademark Office*